United States Patent [19]

Tomantschger et al.

[11] Patent Number: 5,069,988

[45] Date of Patent: Dec. 3, 1991

[54] METAL AND METAL OXIDE CATALYZED ELECTRODES FOR ELECTROCHEMICAL CELLS, AND METHODS OF MAKING SAME

[75] Inventors: Klaus Tomantschger, Mississauga; Karl Kordesch, Lakewood; Robert D. Findlay, Mississauga, all of Canada

[73] Assignee: Battery Technologies Inc., Mississauga, Canada

[21] Appl. No.: 540,932

[22] Filed: Jun. 15, 1990

Related U.S. Application Data

[63] Continuation-in-part of Ser. No. 405,185, Sep. 11, 1989, abandoned, which is a continuation of Ser. No. 234,933, Aug. 22, 1988, abandoned.

[30] Foreign Application Priority Data

Aug. 24, 1987 [CA] Canada .................................. 545225

[51] Int. Cl.$^5$ ........................................... H01M 10/52
[52] U.S. Cl. ...................................... 429/59; 429/224; 429/221; 429/229; 429/206
[58] Field of Search ................... 429/59, 44, 229, 206, 429/224, 221

[56] References Cited

U.S. PATENT DOCUMENTS

| | | | |
|---|---|---|---|
| 2,951,106 | 8/1960 | Ruetschi | 429/59 |
| 3,077,507 | 2/1963 | Kordesch et al. | 429/44 |
| 3,438,812 | 4/1969 | Cherney et al. | 429/59 |
| 3,977,906 | 8/1976 | Beatty et al. | 429/59 |
| 4,434,214 | 2/1984 | Suzuki | 429/59 |

*Primary Examiner*—Donald L. Walton
*Attorney, Agent, or Firm*—Donald E. Hewson

[57] ABSTRACT

Porous electrodes for use in fuel cells and other electrochemical cells are disclosed. Principally, the electrodes a catalytically active layer on a porous conductive substrate, which catalytically active layer is derived from non-noble metals. The loading of the catalytically active layer is lower in terms of weight of catalyst per unit area of geometrical electrode surface than heretofore. Several alternative methods of forming the electrode are taught, including impregnating a porous conductive substrate with a metal salt solution, followed by chemical or thermal formation of the porous catalytically active layer; or mixing the catalytically active material with the material of the porous conductive substrate, followed by fabrication of the electrode; or depositing pyrolitic carbon from the gas phase onto a porous conductive substrate, at elevated temperatures in a gas atmosphere. The electrode may also have a porous metallic current collector, and also a further gas diffusion layer. If used as a fuel cell anode, a further small amount of noble metal is included in the porous catalytically active layer. Porous electrodes of this invention have particular utility in alkaline primary or secondary cells as auxiliary gas recombining electrodes, especially as oxygen consuming auxiliary transfer electrodes.

13 Claims, 1 Drawing Sheet

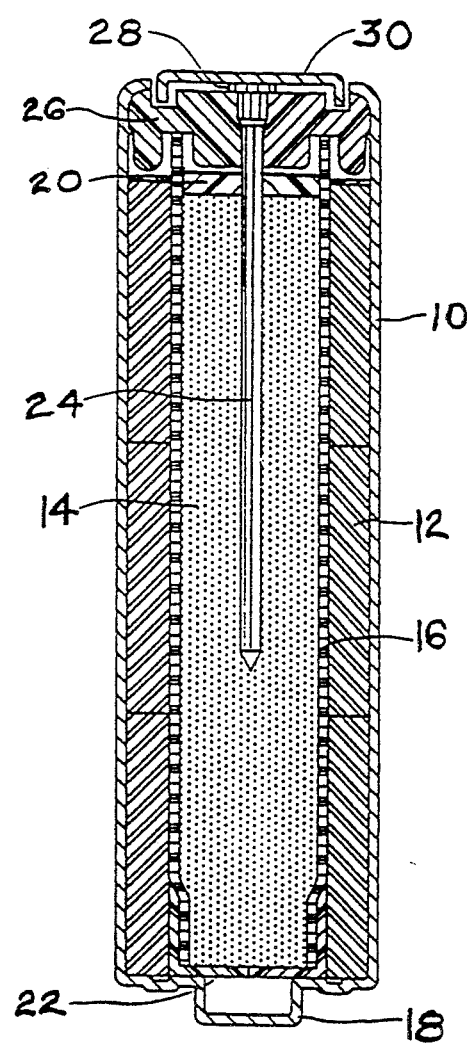

METAL AND METAL OXIDE CATALYZED ELECTRODES FOR ELECTROCHEMICAL CELLS, AND METHODS OF MAKING SAME

CROSS REFERENCE

This application is a Continuation-in-Part of application Ser. No. 07/405,185 filed Sept. 11, 1989, now abandoned which is a Continuation of application Ser. No. 07/234,933 filed Aug. 22, 1988, now abandoned.

FIELD OF THE INVENTION

This invention relates to porous electrodes for fuel cells and similar cells such as air-metal cells, and alkaline zinc/manganese dioxide cells (particularly secondary cells), or other primary or secondary alkaline cells, and to the methods of making the present electrodes. In particular, the invention relates to porous electrodes which may be used as fuel cell cathodes or as auxilliary gas recombining or transfer electrodes in alkaline cells, wherein a catalytically active layer is formed on a porous conductive substrate, and the catalytically active layer is derived from non-noble metals. In the event that the porous electrode is to be used as a fuel cell anode, a further small amount of a noble metal is included in the catalytically active layer. In all events, electrodes according to the present invention have a lower loading of catalytically active layer in terms of weight of catalyst per unit area of geometric electrode surface than heretofore, but with operating characteristics that compare favourably with prior art electrodes having noble metal catalysts, but being available at much reduced costs.

The present invention teaches several alternative methods for producing electrodes according to the present invention; whereby the electrode, once produced, will in all events have a catalytically active layer on a porous conductive substrate. Electrodes of the present invention may comprise a porous metal current collector, and a further gas diffusion layer, with the current collector being situated or embedded in the porous conductive substrate or within the gas diffusion layer.

BACKGROUND OF THE INVENTION

The prior art has concerned itself, for many years, with the provision of porous electrodes that are particularly intended for use in fuel cells. However, while many quite acceptable electrodes have been provided in the prior art, it has been the general experience that such electrodes are expensive to produce. This comes, especially, due to the generally accepted requirement for the use of noble metals in fuel cell electrodes, including especially gas diffusion or porous electrodes. Moreover, when the prior art has provided electrodes which comprise a porous substrate having a porous catalytically active layer thereon, it has been common in the past for there to be relatively high catalyst loading by weight per unit area of geometrical electrode surface, thereby contributing further to the cost of producing such electrodes.

Such prior art has included KORDESCH et al U.S. Pat. No. 3,405,010 dated Oct. 8, 1968, and KORDESCH U.S. Pat. No. 3,310,434, dated Mar. 21, 1967. The former patent relates to the catalyzing of porous electrodes, using a heavy metal salt, an aluminum salt, and a ruthenium salt. The latter patent is particularly related to the use of noble metals as catalysts on a porous electrode.

Yet another KORDESCH patent relating to the use of wet proofed conductive substrates having an active conductive layer with a surface-deposited noble metal catalyst is U.S. Pat. No. 3,899,354, issued Aug. 12, 1975.

BAKER et al in U.S. Pat. No. 3,935,029 issued Jan. 27, 1976 teach the use of fine graphite particules enmeshed in a web of polytetrafluoroethylene (PTFE), however, once again using noble metals.

Thus, it is a principal purpose of the present invention to provide catalyzed electrodes having excellent performance characteristics, at low cost. The catalyzed electrodes of the present invention are specifically adapted for use in fuel cells and metal-air cells; and especially useful as auxilliary gas recombining electrodes in alkaline zinc/manganese dioxide cells (particularly secondary cells), or other primary or secondary alkaline cells. The porous catalyzed electrodes of the present invention have particular utility as oxygen reduction electrodes in alkaline cells as noted above.

Thus, the present invention comprises the provision of a porous electrode which comprises a porous conductive substrate and a porous catalytically active layer on the porous conductive substrate; the porous conductive substrate being chosen from the group consisting of carbon, graphite, and metal; and the porous catalytically active layer being chosen from the group consisting of a catalytically active non-noble metal, an oxide of a catalytically active non-noble metal, carbon, carbon together with a catalytically active non-noble metal, and carbon together with an oxide of a catalytically active non-noble metal. (If used as an anode in a fuel cell, the electrode of the present invention is as described above, together with a further additional smaller amount of a catalytically active noble metal or carbon together with a catalytically active noble metal.)

Catalytically active non-noble metals that are particularly contemplated for use in the present invention include iron, cobalt, nickel, manganese, chromium, copper, and vanadium; and catalytically active noble metals there particularly intended for use in the present invention, in anodes according to this invention, include platinum, palladium, rhodium, iridium, osmium, gold, silver, and ruthenium.

In general, a porous electrode according to the present invention may include the porous active layer chosen from the group consisting of carbon together with a catalytically active non-noble metal, and carbon together with an oxide of a catalytically active non-noble metal; and very often, the porous active layer may further comprise polytetrafluoroethylene (PTFE), as a binder. The carbon may be graphite.

Generally speaking, fuel cells may be considered to be galvanic cells, with the basic reaction being the electrochemical oxidation of a fuel and the electrochemical reduction of an oxidant (e.g., oxygen). It should be noted, however, that fuel cells differ from ordinary primary cells such as commercially available dry cells, in that the fuel and oxidant are generally introduced continuously into the cell electrodes during the production of electricity. Thus, theoretically, the electrodes and electrolyte of fuel cells should maintain a constant value, during the time when the fuel and the oxidant are reacted electrochemically within the fuel cell, and electricity and the product of reaction—usually water—are removed from the fuel cell.

There has been, for the last century or so, a continuing search for ways to boost the electrical output of fuel cells, and/or to increase their service life, and/or to lower the cost of producing fuel cells so as to render them commercially feasible. Needless to say, one major area for research has been the catalysis of reactions which take place within the electrodes of fuel cells, and thereby the requirement for discovering new methods of depositing known catalysts either in a more active form or more economically. However, the search still continues for catalysts which will raise the current density within electrodes, and/or the voltage of the cell, to levels which approach those that are attainable in theory.

On the other hand, there has also developed a pressing need for gas recombining electrodes in closed cells such as alkaline zinc/manganese dioxide cells—especially secondary cells. In such cells, there may be a periodic (or continuing) generation of gasses, and particularly there may be evolution of gaseous oxygen on charge, overcharge, or any reversal of cell polarity. Such cells typically operate over a broad range of temperatures (e.g. from $-40$ to $+65$ degrees celsius) and at current densities where the auxilliary porous electrode may itself be required to pass up to 750 mA/sq. cm.

It is the position of the present inventors that the present invention provides a major step in the required direction, by providing catalyzed porous conductors having relatively low production costs, and with excellent characteristics as to their efficiency, power density, performance, and life. The characteristics of electrodes according to the present invention compare most favourably with the characteristics of certain higher efficiency prior art fuel cell electrodes which, however, contained noble metals in all instances and which therefore were costly to produce.

When used as a catalyzed porous electrodes in fuel cells or alkaline zinc/manganese dioxide cells, electrodes of the present invention may comprise a porous gas diffusion layer adhered to the porous conductive substrate spoken of above, at one side thereof. In fuel cells, electrodes according to the present invention may also generally include porous metal current collectors, as a convenient way of conducting electrical current produced in the fuel cell out of the fuel cell.

In general, the catalyst provided by the present invention is insoluble within the operating voltage and the operating condition range of the electrode, thereby contributing to the life of the electrode. This means that catalyzed porous electrodes according to the present invention may be used with such electrolytes as alkaline electrolytes, for example potassium hydroxide as used in zinc/manganese dioxide cells. It also makes the use of catalyzed porous electrodes according to the present invention in metal-air batteries and cells more attractive.

The inventors herein have discovered, quite unexpectedly, that the addition of a metal or metal oxide from the group consisting of iron, cobalt, nickel, manganese, chromium, copper, and vanadium—all non-noble metals—to a porous electrode provides an electrode having a service life and performance characteristics comparable to those of platinum catalyzed electrodes. Clearly, the cost of electrodes according to the present invention, when compared to the cost of a platinum catalyzed electrode, may be considerably lower. Moreover, platinum catalyzed electrodes may have significant carbon corrosion of the carbon within the porous substrate structure, whereas the use of metals and metal oxides according to the present invention significantly decreases the risk of carbon corrosion. That fact contributes, therefore, to the attractiveness of electrodes according to the present invention for use in alkaline cell systems, and metal-air batteries. In addition, dissolved trace amounts of noble metals can cause problems in metal-air or other batteries containing a zinc, iron or aluminum anode by enhancing the hydrogen evolution (gassing reaction). This enhanced anode corrosion causes higher self-discharge and can result in cell leakage.

According to the present invention, the porous conductive substrate of electrodes may be carbon, graphite, or metal; or, indeed, any other suitable conductive material. The porous active layer may comprise a catalytically active non-noble metal as discussed above, an oxide of a catalytically active non-noble metal, carbon, carbon together with a catalytically active non-noble metal, and carbon together with a oxide of catalytically active non-noble metal. Typically, the porous active layer consists of carbon together with a catalytically active non-noble metal or carbon together with an oxide of catalytically active non-noble metal; and in either case, it may further comprise a binder, usually PTFE.

A typical porous electrode according to the present invention would consist of an electrochemically active layer which may be typically from 50 to 500 microns thick, and it may further include a gas diffusion layer which may also be 50 to 500 microns thick. If used in a fuel cell, the electrode would usually also have a metal screen current collector (a porous metallic current collector) embedded in an electrode layer—unless a bipolar construction method is applied. The electrochemically active layer, as noted would contain the electrocatalyst as described above, supported on a carbon, graphite or metal porous substrate, and is located on the electrolyte side of the electrode.

A gas diffusion layer, when used, may typically consist of PTFE bonded carbon, and would normally have a higher degree of hydrophobicity than the active layer. During the manufacturing process of the gas diffusion layer, discussed in greater detail hereafter, a pore builder such as ammoniumbicarbonate, may be used. The current collector, when used, may be embedded in either the gas diffusion layer or the active layer; and when electrodes according to the present invention are used in bipolar cells, no current collector is required.

Typically, the total electrode thickness of an electrode comprising an active layer, a gas diffusion layer, and a current collector, may range from 100 to 750 microns.

Thus, porous electrodes according to the present invention may comprise a porous conductive substrate, and a porous gas diffusion layer adhered to one side thereof. As noted, the porous active layer is at a first side of the porous conductive substrate, and the porous gas diffusion layer is at the side of the porous conductive substrate opposite to that of the active layer. Of course, the porous active layer may permeate the porous conductive substrate, and in any event the porous gas diffusion layer is adhered to one side thereof.

As noted above, electrodes according to the present invention may also be used as anodes in fuel cells, in which case a further additional smaller amount of a catalytically active noble metal or carbon together with a catalytically active noble metal is added to the catalytically active layer of the electrode. There is little point in providing oxides of catalytically active noble metals, since the oxide would be promptly reduced to the noble metal per se when exposed to the hydrogen fuel generally used in a fuel cell.

The noble metals contemplated for use in this aspect of the invention are discussed above.

The concentration of catalyst within the porous catalytically active layer is generally in the range of from 0.1 to 10 mg per square centimeter of the geometrical electrode surface area. Typically, the concentration of catalyst within the porous catalytically active layer is in the range of from 1 to 5 mg per square centimeter of the geometrical electrode surface area.

In general, cathodes for hydrogen/oxygen fuel cells, according to the present invention, may have a service life well in excess of two thousand hours at a current density of 100 milliamperes per square centimeter, at a voltage above 0.85 volts versus RHF (Reversible Hydrogen Electrode). Similar electrodes, using non-noble metal oxide catalysts, can be run at up to 300 miliamperes per square centimeter on oxygen and air, with potentials of about 0.8 volts and 0.79 volts versus RHF, respectively. As auxilliary gas recombining electrodes used in alkaline electrochemical cells such as zinc/manganese dioxide cells having potassium hydroxide electrolytes, the electrodes may be successfully subjected to current densities up to 750 mA/sq. cm. at low temperatures.

The present invention provides three generally related but distinct processes for the production of porous electrodes in keeping herewith. Those three general methods may be characterized as follows:

I
(a) impregnating a porous conductive substrate structure with a compound containing the chosen material for the porous catalytically active layer; and
(b) forming the porous catalytically active layer:

II
(a) mixing the chosen material for said porous catalytically active layer with the chosen material for the porous conductive substrate; and
(b) fabricating the electrode:

III
(a) depositing pyrolitic carbon from the gas phase onto a porous conductive substrate structure, at an elevated temperature in a gas atmosphere.

The compound used in step (a) of Process I, above, is a metal salt solution of the chosen catalytically active metal. The formation process of step (b) of the Process I may be the chemical formation of the porous active layer, or the thermal formation of the porous active layer.

The chosen active material that is used in step (a) of the Process II, may further be mixed with carbon and PTFE.

The Process III is carried out at least 600 degrees C, and the gas atmosphere may be steam, carbon dioxide, carbon monoxide, ammonia, nitrogen, argon, or hydrogen.

BRIEF DESCRIPTION OF THE DRAWINGS

A typical embodiment of the present invention when used as an auxilliary electrode as an oxygen gas recombining electrode in an alkaline zinc/manganese dioxide cell is shown in the single FIGURE of drawing which accompanies the following discussion.

DESCRIPTION OF THE PREFERRED EMBODIMENTS

The FIGURE shows a typical embodiment of an alkaline zinc/manganese dioxide cell having an auxilliary porous oxygen gas recombining electrode in keeping with the present invention. The cell comprises a steel can 10 having a conventional metal oxide cathode 12 which is typically formed cylindrically around an anode 14. The cathode 12 may comprise finely divided manganese dioxide and graphite, and the anode may comprise zinc powder. Between the cathode and the anode is an electrolyte permeable separator 16. When the cathode is manganese dioxide and the anode is zinc, then the electrolyte may be an aqueous solution of potassium hydroxide. A boss or a pip 18 is formed at the base of the can 10, to give the cathode or positive contact for the cell.

The electrolyte permeable separator 16 is typically formed of rayon/polyvinyl alcohol. The anode may have at its upper end an auxilliary porous gas recombining electrode 20, which is arranged so as to be wetted by the electrolyte. At its lower end, the anode may be provided with an insulated disc or basket 22, to preclude anode contact with the cathode pip 18.

A current collector nail 24 projects into the anode 14 through a casing cover 26, with the head 28 of the collector nail 24 being on the outside of the cover 26 to form the anode contact for the cell. The cover 26 seals the can 10 by crimping formed around its edge. An additional anode cover 30 is provided to give the anode or negative contact for the cell.

The cathode may be provided with auxilliary cathode material to catalyze the reabsorbtion of hydrogen as set forth in KORDESCH and TOMANTSCHGER U.S. Pat. No. 4,925,747 issued May 15, 1990. The auxilliary electrode 20 may have the characteristics set forth in TOMANTSCHGER and KORDESCH U.S. Pat. No. 4,900,642 issued Feb. 13, 1990.

There follow several examples of various electrode structures according to the present invention, their manufacture, and their operating characteristics.

EXAMPLE I:

Under the general steps of Process I noted above, a graphite felt (for example, a graphite product available commercially as PANEX (TM) CFP 30-10) was impregnated with manganese nitrate solution and pressed into a layer which comprised a mixture of carbon available commercially as "SHAWINIGAN BLACK" (TM) and PTFE. The carbon/PTFE layer comprised 62.5% carbon, 37.5% PTFE.

The catalyst was thermally formed at 300 degrees C., in air, and resulted in an electrode having catalyst loading of 1.5 mg. of manganese per square centimeter of geometrical electrode surface area. The following table demonstrates the electrode performance, as a cathode at the oxygen side of an oxygen/hydrogen fuel cell system having 9 N KOH electrolyte, at 65 degrees C.

| Current Density [mA/sq. cm.] | IR free potential [mV vs. RHE] |
| --- | --- |
| 0 | 993 |
| 10 | 882 |
| 50 | 838 |
| 75 | 828 |
| 100 | 822 |
| 150 | 814 |

-continued

| Current Density [mA/sq. cm.] | IR free potential [mV vs. RHE] |
| --- | --- |
| 200 | 806 |
| 250 | 802 |
| 300 | 800 |
| 400 | 796 |
| 500 | 788 |

[The IR free potential is determined using laboratory procedures and standards, and is measured in millivolts as against a Reversible Hydrogen Electrode reference].

EXAMPLE II

Again, using the general Process I, an active layer of nickel FIBREX (TM) felt was impregnated with manganese nitrate solution, and again pressed into a carbon/PTFE layer as in Example I. The catalyst was thermally formed at 300 degrees C. in air, with a catalyst loading of 7.6 mg. of manganese per square centimeter of geometrical electrode surface area.

The electrode performance in an oxygen/hydrogen fuel cell system, having 6 N KOH electrode, at 20 degrees C., was as follows:

| Current Density [mA/sq. cm.] | IR free potential [mV vs. RHE] |
| --- | --- |
| 0 | 942 |
| 10 | 828 |
| 50 | 809 |
| 75 | 801 |
| 100 | 793 |
| 125 | 789 |
| 150 | 764 |

EXAMPLE III

In this case, activated carbon plus an active catalyst was used, in a multi-layer PTFE bonded carbon electrode. The gas diffusion layer was a carbon/PTFE layer as described above in Examples I and II.

The active layer comprised carbon black available commercially as VULCAN (TM) XC 72R which was activated to 30% weight loss in the presence of cobalt-aluminum spinel (5 mmol cobalt, 10 mmol aluminum per 100 grams of carbon), in the amount of 67%; together with graphite in the amount of 22%, and PTFE in the amount of 11%.

The catalyst loading was 5 mg. of manganese dioxide per square centimeter of geometrical electrode surface area, which may also be expressed as 3.2 mg. of manganese per square centimeter of geometrical electrode surface area.

The electrode was operated for 220 hours at 100 milliamperes per square centimeter at 65 degrees C. in 12 N KOH. The oxygen and air operation, both, of the electrode are set forth in the following table:

| Current Density [mA/sq. cm.] | IR free potential [mV vs. RHE] Oxygen | IR free potential [mV vs. RHE] Air |
| --- | --- | --- |
| 0 | 1025 | 1021 |
| 10 | 937 | 915 |
| 50 | 900 | 880 |
| 75 | 895 | 864 |
| 100 | 888 | 857 |
| 150 | 881 | 845 |
| 200 | 870 | 827 |
| 250 | 864 | 810 |
| 300 | 857 | 792 |

The electrode was also operated at 150 milliamperes per square centimeter, over a varying range of temperatures, with air operation being observed as set forth in the following table.

| Temperature [C.] | IR free potential at 150 mA/cm Air operation [mV vs. RHE] |
| --- | --- |
| 75 | 845 |
| 70 | 841 |
| 65 | 834 |
| 60 | 836 |
| 55 | 831 |
| 50 | 822 |
| 45 | 812 |
| 40 | 810 |
| 35 | 788 |
| 30 | 749 |
| 25 | 737 |

Finally, oxygen long term performance in 12 N KOH at 65 degrees C., operating at 100 milliamperes per square centimeter, was determined as follows:

Oxygen long term performance in 12 N KOH at 65 C. and 100 mA/cm

| time [hrs] | IR free potential at 100 mA/cm [mV vs. RHE] |
| --- | --- |
| 0 | 820 |
| 100 | 890 |
| 500 | 893 |
| 1000 | 890 |
| 1500 | 851 |
| 2000 | 822 |

EXAMPLE IV

Under the Process III, VULCAN (TM) XC 72 R carbon was activated in the presence of 5 mmol of cobalt per 100 grams of carbon in the gas phase, in a carbon dioxide gas atmosphere, at 1000 degrees C. This resulted in an active layer consisting of carbon activated at 1000' C. in carbon dioxide atmosphere, in the amount of 95.2% containing cobalt oxide; with PTFE in the amount of 4.8%.

The catalyst loading was determined to be 1.3 mg. of cobalt per square centimeter of geometrical electrode surface area.

The electrode performance was determined in 9 N KOH, at 20 degrees C. with oxygen, as follows:

| Current Density [mA/sq. cm.] | IR free potential [mV vs. RHE] |
| --- | --- |
| 0 | 905 |
| 1 | 832 |
| 10 | 796 |
| 50 | 765 |
| 100 | 755 |
| 150 | 725 |
| 250 | 689 |
| 500 | 631 |
| 750 | 607 |

EXAMPLE V

Along the general lines of preparation of an electrode in keeping with Example II, an anode was fabricated, as follows:

The gas diffusion layer comprised carbon (SHAWINIGAN BLACK) in the amount of 50%, with 50% PTFE.

The active layer comprised superconductive carbon black available commercially as BLACK PEARLS (TM) activated to 30% weight loss in the presence of cobalt-aluminum spinel (5 mmol cobalt, 10 mmol aluminum per 100 grams of carbon), together with ruthenium (0.2 grams Ru per 100 grams of carbon) all in the amount of 80%; with 20% PTFE.

The following table demonstrates the performance of this electrode, as an anode, after 165 hours at 100 milliamperes per square centimeter at 65 degrees C. in 12 N KOH, with hydrogen:

| Current Density [mA/sq. cm.] | IR free potential [mV vs. RHE] |
|---|---|
| 0 | 0 |
| 10 | 1 |
| 50 | 6 |
| 75 | 8 |
| 100 | 11 |
| 150 | 15 |
| 200 | 23 |
| 250 | 28 |

Operation at 150 milliamperes per square centimeter over a range of temperatures, resulted in the following:

| Temperature [C.] | IR free potential at 150 mA/cm [mV vs. RHE] |
|---|---|
| 85 | 23 |
| 80 | 23 |
| 75 | 23 |
| 70 | 23 |
| 65 | 23 |
| 60 | 26 |
| 55 | 28 |
| 50 | 33 |
| 45 | 36 |
| 40 | 43 |
| 35 | 46 |
| 30 | 63 |
| 25 | 92 |

Finally, hydrogen long term performance in 12 N KOH at 65 degrees C. and 100 milliamperes per square centimeter was determined, with the following results:

| time [hrs] | IR free potential at 100 mA/cm [mV vs. RHE] |
|---|---|
| 0 | 10 |
| 100 | 39 |
| 500 | 55 |
| 1000 | 49 |
| 1500 | 83 |
| 2000 | 109 |
| 2500 | 85 |
| 3000 | 68 |

There have been described electrodes that are intended for use as cathodes in fuel cells (or metal-air cells), or as auxilliary gas recombining electrodes in sealed alkaline cells, which electrodes have excellent operating characteristics and which are produced without the requirement for use of noble metals. When a small additional amount of noble metal has been used, however, the electrodes are suitable for use as anodes in fuel cells, with equally good operating characteristics and comparatively low costs of production.

It should be noted that electrodes according to the present invention may be used as gas recombining electrodes in rechargeable alkaline zinc/manganese dioxide cells, as well as in other primary or secondary alkaline cells. In particular, electrodes such as those described above in Examples I to IV have utility as gas recombining electrodes such as for oxygen recombination in alkaline cells. The ability of such auxilliary porous electrodes to function at low temperatures and high current densities has been demonstrated.

The scope of this invention is defined in the accompanying claims.

What is claimed is:

1. An alkaline electrochemical cell having a cathode, an anode, an alkaline electrolyte, and a porous electrode for use as an oxygen reduction electrode when said electrochemical cell operates at current densities up to 750 mA/sq.cm.; wherein said porous electrode comprises a porous conductive substrate and a porous catalytically active layer on said porous conductive substrate; wherein said porous conductive substrate is chosen from the group consisting of carbon, graphite, and metal; and wherein said porous catalytically active layer is chosen from the group consisting of a catalytically active non-noble metal, an oxide of a catalytically active non-noble metal, and carbon together with an oxide of a catalytically active non-noble metal.

2. The alkaline electrochemical cell of claim 1, wherein said catalytically active non-noble metal is chosen from the group consisting of iron, cobalt, nickel, manganese, chromium, copper, and vanadium.

3. The alkaline electrochemical cell of claim 2, wherein said porous catalytically active layer is chosen from the group consisting of carbon together with a catalytically active non-noble metal, and carbon together with an oxide of a catalytically active non-noble metal; and said porous catalytically active layer further comprises polytetrafluoroethtlene (PTFE) as a binder.

4. The alkaline electrochemical cell of claim 3, wherein said carbon component is graphite.

5. The alkaline electrochemical cell of claim 2, wherein the concentration of catalyst within the porous catalytically active layer is in the range of 0.1 to 10 mg/cm of the geometrical electrode surface area.

6. The alkaline electrochemical cell of claim 5, wherein the concentration of catalyst within the porous catalytically active layer is in the range of 1 to 5 mg/cm of the geometrical electrode surface area.

7. The alkaline electrochemical cell of claim 1, wherein said anode is zinc, said electrolyte is potassium hydroxide, and, said cathode is manganese dioxide.

8. The alkaline electrochemical cell of claim 1, wherein said anode is chosen from the group comprising iron and aluminum.

9. An alkaline electrochemical cell having an anode, an alkaline electrolyte, a cathode, and a further porous electrode for use as a gas recombining electrode;
wherein said porous electrode comprises a porous conductive substrate and a porous catalytically active layer on said porous conductive substrate; wherein said porous conductive substrate is chosen from the group consisting of carbon, graphite, and metal; and wherein said porous catalytically active layer is chosen from the group consisting of a catalytically active non-noble metal, an oxide of a catalytically active non-noble metal, and carbon together with an oxide of a catalytically active non-noble metal; and wherein said gas recombining electrode recombines oxygen generated within said cell.

10. The alkaline electrochemical cell of claim 9, wherein said anode is a zinc anode, said alkaline electrolyte is potassium hydroxide, and said cathode is manganese dioxide.

11. The alkaline electrochemical cell of claim 10, wherein said cell is a secondary cell.

12. The alkaline electrochemical cell of claim 10, wherein said carbon component is graphite.

13. The alkaline electrochemical cell of claim 9, wherein said porous catalytically active layer is chosen from the group consisting of carbon together with a catalytically active non-noble metal, and carbon together with an oxide of a catalytically active non-noble metal; and said porous catalytically active layer further comprises polytetrafluoroethylene (PTFE) as a binder.

* * * * *